3,362,974
MERCURIC, CADMIUM AND CUPRIC SALTS OF 5,6,7,8,9,9 - HEXACHLORO - 1,2,3,4,4a,5,8,8a - OCTAHYDRO-1,4,5,8-DIMETHANONAPHTHALENE-2,3-DICARBOXYLIC ACID

Morton Kleiman, Chicago, Ill., assignor to Velsicol Chemical Corporation, a corporation of Delaware
No Drawing. Original application Aug. 26, 1964, Ser. No. 392,310, now Patent No. 3,288,813, dated Nov. 29, 1966. Divided and this application May 7, 1965, Ser. No. 454,158
3 Claims. (Cl. 260—429)

This application is a division of my co-pending application Serial No. 392,310, filed Aug. 26, 1964, now Patent No. 3,288,813, which in turn is a continuation in part of application Ser. No. 78,297, filed Dec. 27, 1960, now abandoned.

This invention relates to new chemical compositions of matter. More specifically, this invention relates to the new chemical compound 5,6,7,8,9,9-hexachloro-1,2,3,4,4a,5,8,8a - octahydro - 1,4,5,8-dimethanonaphthalene-2,3-dicarboxylic acid, its anhydride, and its heavy metal salts. For convenience, the new acid of this invention will be referred to hereinafter as Compound I.

The heavy metal salts of Compound I have been found to have surprisingly high fungicidal activity and are useful for the control of a wide variety of economically undesirable fungi. By heavy metal salts are meant those salts in which one or both of the hydrogen atoms in the carboxylic acid groups of Compound I have been substituted by the cation of a metal whose specific gravity is greater than four. Preferred salts, of course, are those which are made from commercially abundant heavy metals such as antimony, arsenic, bismuth, cadmium, chromium cobalt, copper, iron, lead, manganese, mercury, nickel, tin, and zinc.

These salts can be prepared readily from Compound I and its anhydride by first treating the starting material with sufficient sodium or potassium hydroxide solution to form an aqueous solution of its sodium or potassium salt. It is often convenient to add a little acetone to the mixture of facilitate solution of the starting material in the base solution. The salt solution can then be brought to a pH of about 7 by neutralizing it with a dilute acid such as nitric, hydrochloric, or sulfuric acid. The neutral solution can then be treated with an aqueous solution of the theoretical quantity of a salt, usually the nitrate or the acetate, of the heavy metal desired. Ordinarily, the heavy metal salts of Compound I separate from the solution and can simply be filtered, washed with water, and dried. The yields are nearly quantitative; and sometimes the apparent yield is in excess of the theoretical value, indicating that the hydrated salt has been formed. Although the salts formed in this manner can be used directly as fungicides without further treatment, they can be purified by crystallization, chromatography, or other techniques known to the art.

The anhydride of Compound I can be prepared by the Diels-Alder addition of the commercial chemicals hexachlorocyclopentadiene and 3,6 - endomethylene - 1,2,3,6-tetrahydrophthalic anhydride, or it can be prepared by the dehydration of Compound I. The discovery that the Diels-Alder addition of the two compounds indicated actually can be carried out was very surprising. 3,6-endomethylene-1,2,3,6-tetrahydrophthalic anhydride, which is itself the Diels-Alder adduct of cyclopentadiene and maleic anhydride, has been reported to dissociate into its components even on warming. One skilled in the art would expect, therefore, that any attempt to add hexachlorocyclopentadiene to 3,6-endomethylene-1,2,3,6-tetrahydrophthalic anhydride by heating a mixture of the two compounds would lead to the dissociation of the anhydride and give rise to complex cross-adductions between hexachlorocyclopentadiene, cyclopentadiene, and maleic anhydride. Contrary to these expectations, however, it has been found that the anhydride of Compound I can be prepared in good yield by the direct addition of hexachlorocyclopentadiene and 3,6 - endomethylene - 1,2,3,6 - tetrahydrophthalic anhydride with heating.

When the preparation of the anhydride of Compound I is carried out by the addition reaction, equimolecular quantities of the reactants can be used; but it is preferred to use an excess of hexachlorocyclopentadiene. Although the reaction can be carried out satisfactorily by heating the reactants alone, a relatively inert solvent such as benzene, xylene, or toluene can also be used if desired. The temperature at which the reaction is carried out is not critical, but it is preferred to use temperatures below about 150° C. and most preferably between about 30° C. and about 125° C. to minimize undesirable side reactions. While the reaction is ordinarily carried out at atmospheric pressure, it can also be carried out at sub- or superatmospheric pressures.

Good yields of product can be obtained on heating for a few hours, but the highest yields are usually obtained by heating the reactants for several days. Reaction times of from about one to six days are preferred. When the reaction mixture is cooled, the desired anhydride usually precipitates out and can be filtered off, washed with cold solvent, and dried. A pure crystalline product can be obtained by recrystallization from a suitable solvent such as benzene or xylene. The product can also be isolated from the reaction mixture by extraction with an aqueous base solution.

Compound I itself can be prepared by the direct addition of hexachlorocyclopentadiene to 3,6-endomethylene-1,2,3,6-tetrahydrophthalic acid in the Diels-Alder manner, or it can be prepared by hydrolysis of the anhydride obtained as described above. The anhydride can be brought into solution with an aqueous solution of a base as described for the preparation of the heavy metal salts above. Acidification of this solution with a dilute mineral acid will then precipitate the desired Compound I, which can be filtered, washed with water, and dried.

While Compound I and its anhydride are useful as intermediates in the preparation of the heavy metal salts of this invention, they also have valuable utility by themselves. The presence of the highly halogenated ring makes them useful in plastic and resinous compositions as flameproofing agents. Similarly, the highly halogenated ring imparts properties which make them useful as extreme pressure agents in lubricating compositions. In addition, Compound I and its anhydride are useful as intermediates in the preparation of plasticizers, polyester resins, alkyd resins, and cured epoxy resins. When Compound I or its anhydride is esterified with normal or branched alcohols such as n-butyl alcohol, sec-butyl alcohol, isobutyl alcohol, hexyl alcohol, octyl alcohol, decyl alcohol and the like, the ester thus obtained is useful as a plasticizer. When Compound I or its anhydride is polyesterified with polyols such as ethylene glycol, propylene glycol and the like, and an unsaturated dibasic acid such as maleic acid, fumaric acid and the like, and this product is dissolved in a vinyl monomer such as styrene, a polyester resin is produced. Compound I or its anhydride when treated with a dibasic acid such as maleic acid, fumaric acid and the like, a polyol such as glycerol, pentaerythritol and the like, and an oil or polyunsaturated fatty acid yields an alkyd resin. Compound I or its anhydride dissolved in an epoxy resin and heated will yield a cured epoxy resin.

The manner in which the new compounds of this invention can be prepared is illustrated in the following examples.

EXAMPLE 1

*Preparation of 5,6,7,8,9,9-hexachloro 1,2,3,4,4a,5,8,8a-octahydro - 1,4,5,8 dimethanonaphthalene-2,3-dicarboxylic anhydride*

3,6-endomethylene - 1,2,3,6 - tetrahydrophthalic anhydride (164 g.; 1.0 mole) and hexachlorocyclopentadiene (1911 g.; 7 moles) were placed in a round-bottomed flask fitted with a mechanical stirrer, internal thermometer, and reflux condenser. The mixture was then stirred and heated at a temperature of 120–125° C. for a period of six days. On cooling of the reaction mixture, 283 g. of a crude solid separated and was filtered. The solid was recrystallized several times from benzene and dried to give a total of 185.5 g. (42.2% of theory) of the title compound M.P. 270.5–273° C.

Another sample of the title compound was purified by alkali extraction followed by dehydration and recrystallization to give an analytical sample, M.P. 268–270° C.

Analysis for $C_{14}H_8Cl_6O_3$: theory C, 38.48%; H, 1.85%; Cl, 48.69%. Found: C, 38.41%; H, 1.90%; Cl, 48.77%.

The anhydride of Example 1 has exhibited unexpected and surprising thermal stability as indicated in the following example.

EXAMPLE 2

5,6,7,8,9,9-hexachloro - 1,2,3,4,4a,5,8,8a - octahydro-1,4,5,8-dimethanonaphthalene-2,3-dicarboxylic anhydride (0.50 g.), a white powder, was placed into a Gardner color tube and the tube was put into an oven. The compound was then heated at about 195° C. for 15 hours. At the end of this period, the compound remained a white powder. This powder was then dissolved in methyl ethyl ketone (5 ml.) and a clear, colorless solution resulted. Another portion of the compound of Example 1 (0.5 g.) was placed into a test tube and the tube was placed into an oil bath equipped with a thermometer. The tube was then heated to 275° C., the melting point of the compound. There was no indication of decomposition (i.e. no evolution of hydrogen chloride) at these elevated temperatures and the compound remained a white powder until it melted.

EXAMPLE 3

*Preparation of the acid (Compound I)*

A sample of the anhydride prepared as described in Example 1 was hydrolyzed by heating it with a 0.05 N solution of NaOH. The cooled solution was acidified, and the resulting precipitate was filtered, washed with water, and dried to give the desired Compound I.

The acid of Example 3 has exhibited unexpected and surprising thermal stability as indicated in the following example.

EXAMPLE 4

5,6,7,8,9,9-hexachloro - 1,2,3,4,4a,5,8,8a - octahydro-1,4,5,8-dimethanonaphthalene-2,3-dicarboxylic acid (0.50 g.) a white powder, was placed into a Gardner color tube and the tube was put in an oven. The compound was then heated at about 195° C. for 15 hours. At the end of this period, the compound remained a white powder. This powder was then dissolved in methyl ethyl ketone (5 ml.) and a clear, colorless solution resulted. Another portion of the compound of Example 1 (0.5 g.) was placed into a test tube and the tube was placed into an oil bath equipped with a thermometer. The tube was then heated to 270° C., the melting point of the compound. There was no indication of decomposition (i.e. no evolution of hydrogen chloride) at these elevated temperatures and the compound remained a white powder until it melted.

EXAMPLE 5

*Preparation of the lead salt of Compound I*

The anhydride of Compound I (13.1 g.; 0.03 mole) was suspended in 20 ml. of acetone and then treated with a solution of sodium hydroxide (2.6 g.; 0.066 mole) in 400 ml. of water. The mixture was stirred and heated for about 10 minutes until solution was effected, whereupon it was neutralized with dilute nitric acid and treated with a solution of lead nitrate (10.0 g.; 0.03 mole) in 50 ml. water. The gelatinous precipitate which formed was filtered off and stirred with 300 ml. of boiling water. The precipitate, now curdy in form, was filtered, washed with hot water, dried in the oven at 110° C. for 8 hours, and finally dried over KOH in vacuo for four days to give 19.2 g. (97% of theory) of the lead salt of Compound I.

Other salts of Compound I were prepared in a similar manner. Generally, the anhydride of Compound I was dissolved in a 10% excess of warm, aqueous, 0.1 molar NaOH admixed with about 10% its volume of acetone to hasten solution. The solution was then filtered, neutralized, and treated with a solution of the acetate or nitrate of the desired metal. The precipitated salt was filtered, washed with water, pressed dry, and dried for two weeks over solid KOH. The yields in most cases exceeded the theoretical values, indicating a high stability of the hydrated salts at room temperature. The salts obtained in this manner were as follows:

| Ex. | Metal | Yield Obtained (g.) | Theoretical yield (g.) | Color |
|---|---|---|---|---|
| 6 | Mercury ($Hg^{++}$) | 19.6 | 19.6 | White. |
| 7 | Copper ($Cu^{++}$) | 15.5 | 15.5 | Blue. |
| 8 | Cadmium | 16.7 | 17.0 | White. |
| 9 | Cobalt ($Co^{++}$) | 17.0 | 15.4 | Violet-Pink. |
| 10 | Manganese ($Mn^{++}$) | 17.4 | 15.2 | White. |
| 11 | Zinc | 16.2 | 15.5 | Do. |
| 12 | Iron ($Fe^{+++}$) | 15.2 | 14.7 | Buff. |

A number of experiments were carried out to demonstrate the fungicidal activity of the heavy metal salts of this invention. For example, the compounds were tested for inhibition of spores of *Monilinia fructicola* by a glass-slide technique. A 0.1 g. sample of the compound was stirred into a few cc. of ethyl alcohol or acetone, and sufficient distilled water and a solution of 0.2% orange juice containing 100,000 spores per cc. were added to give the desired concentrations of the test compound. Four drops of each compound-spore suspension were placed on chemically clean glass slides in moist chambers and kept at 20° C. for 24 hours. The percentage of spore germination in comparison to untreated controls was then recorded. In these tests, the mercuric salt of Compound I gave a 99% inhibition of growth at a concentration of 16 p.p.m., while the cadmium salt of Compound I gave 94% inhibition at a concentration of 31 p.p.m.

Tests were also carried out for the control of *Colletotrichum legenarium*, which causes anthracnose of cucurbits. In these tests, sprays of the test compounds at various concentrations were applied to cucumber plants at 40 lb. pressure for one minute, which resulted in the delivery of about 120 ml. of spray. The plants were allowed to dry, and the spores were applied at a concentration of 25,000 spores per ml. The spore suspension was applied at 20 lbs. pressure for one minute, which resulted in the delivery of about 20 ml. of suspension. The plants were then placed in an incubation chamber for 24 hours at 20° C. and a relative humidity of 100%. The plants were moved to the greenhouse, and lesions were counted on the 1st and 2nd leaves five days after inoculation of both treated plants and untreated checks. In these tests, the mercuric salt of Compound I gave 91% control of the disease at a concentration of 125 p.p.m., while the cadmium salt of Compound I gave 82% control at the same concentration.

Pesticidal compositions of this invention can be prepared by mixing one or more of the new heavy metal salts of this invention with inert carriers to provide formulations adapted for ready and efficient application with conventional applicator equipment to the site of the pest infestation. For example, pesticidal compositions or formulations according to this invention can be prepared in the form of solids or liquids. Solid compositions are preferably in the form of dusts or granular formulations. For example, these are prepared to give homogeneous, free-flowing dusts by admixing an active salt or salts of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or granular form can also be used.

Liquid compositions according to this invention can be prepared by admixing one or more of the new salts of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, sodium lauryl sulfate, sodium naphthalenesulfonate, sodium salt of ligninsulfonic acid, polyoxyethylene fatty alcohol ethers, polyoxypropylene fatty alcohol ethers, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 13

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| Mercuric salt of Compound I | 25 |
| Sodium lauryl sulfate | 2 |
| Sodium lignin sulfonate | 3 |
| Kerosene | 70 |

EXAMPLE 14

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| Cadmium salts of Compound I | 75.00 |
| Fuller's earth | 22.75 |
| Sodium lauryl sulfate | 2.00 |
| Methyl cellulose | .25 |

EXAMPLE 15

*Preparation of an oil-dispersible powder*

The following components are blended and ground as described in the previous example to give a powder which can be dispersed in oil to form a spray containing the desired concentration of active compound.

| | |
|---|---|
| Cupric salt of Compound I | 70 |
| Condensation product of diamylphenol with ethylene oxide | 4 |
| Fuller's earth | 26 |

EXAMPLE 16

*Preparation of a dust*

The following ingredients are mixed thoroughly and then ground to an average particle size of less than about 50 microns to give a dust suitable for application with conventional dusting equipment.

| | |
|---|---|
| Mercuric salt of Compound I | 20 |
| Talc | 80 |

EXAMPLE 17

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| Cadmium salt of Compound I | 10 |
| Fuller's earth | 66 |
| Dextrin | 20 |
| Sodium lignin sulfonate | 3 |
| Kerosene | 1 |

I claim:

1. Mercuric 5,6,7,8,9,9 - hexachloro - 1,2,3,4,4a,5,8,8a-octahydro - 1,4,5,8 - dimethanonaphthalene - 2,3 - dicarboxylate.

2. Cadmium 5,6,7,8,9,9 - hexachloro - 1,2,3,4,4a,5,8,8a-octahydro - 1,4,5,8 - dimethanonaphthalene - 2,3 - dicarboxylate.

3. Cupric 5,6,7,8,9,9 - hexachloro - 1,2,3,4,4a,5,8,8a-octahydro - 1,4,5,8 - dimethanonaphthalene - 2,3 - dicarboxylate.

No references cited.

TOBIAS E. LEVOW, *Primary Examiner.*

A. P. DEMERS, *Assistant Examiner.*